United States Patent [19]

Katzen

[11] 4,078,094

[45] Mar. 7, 1978

[54] PROCESS FOR PRODUCING AN ANIMAL FEED AND FERTILIZER INGREDIENT FROM ANIMAL MANURE

[76] Inventor: Sol Katzen, Hanasi 62, Herzliya Pituach, Israel

[21] Appl. No.: 723,617

[22] Filed: Sep. 15, 1976

[30] Foreign Application Priority Data

Nov. 7, 1975  Israel .................................... 48435

[51] Int. Cl.$^2$ .................................................. A23K 1/08
[52] U.S. Cl. ....................................... 426/641; 426/807; 71/12; 71/15; 71/21
[58] Field of Search ............... 71/12, 13, 15, 21; 426/431, 641, 807

[56] References Cited

U.S. PATENT DOCUMENTS

| 1,325,787 | 12/1919 | Grossman | 71/12 X |
|---|---|---|---|
| 1,430,182 | 9/1922 | Peck | 71/12 X |
| 3,050,383 | 8/1962 | Wilson | 71/12 X |
| 3,950,562 | 4/1976 | Senior | 71/12 X |
| 3,971,720 | 7/1976 | Swanson et al. | 71/15 X |

*Primary Examiner*—Charles N. Hart
*Assistant Examiner*—Ferris H. Lander
*Attorney, Agent, or Firm*—Virgil H. Marsh

[57] ABSTRACT

A process for producing an animal feed and a fertilizer ingredient from animal manure which comprises acid solution and either wet or dry manure. The essentially basic minerals contained in the manure chemically react with the acid to form soluble salts. The acid and essentially basic minerals are used in an amount so that there is an equal molar reaction basis and so that sterilization of the manure is achieved. A slurry containing various solid fractions and an acid-water fraction is formed. The various fractions, each separated from each other, are recovered from the slurry.

13 Claims, No Drawings

PROCESS FOR PRODUCING AN ANIMAL FEED AND FERTILIZER INGREDIENT FROM ANIMAL MANURE

BACKGROUND OF THIS INVENTION

1. Field of This Invention

This invention relates to a process for producing an animal feed or a fertilizer ingredient from animal manure and to the resultant animal feed or fertilizer ingredient.

2. Prior Art

Approximately one fourth of all feed consumed by animals is incompletely metabolized and consequently excreted. In addition the breakdown products of the cells of the various body organs are also eliminated in the feces or urine. Conventional disposal of those wastes sometimes creates problems of environmental pollution and is certainly wasteful of valuable nutrients that could be utilized to replace costly grains, hay and oilseeds in the formulation of diets for animals.

BROAD STATEMENT OF THIS INVENTION

An object of this invention is to provide a process for producing an animal feed and a fertilizer ingredient from animal manure. Other objects and advantages of this invention are set out elsewhere herein or are obvious to one ordinarily skilled in the art herefrom.

The objects and advantages of this invention are achieved by the process and composition of this invention.

This invention involves a process for producing an animal feed and a fertilizer ingredient from animal manure. The process includes admixing an acid solution and either wet or dry manure. The essentially basic minerals contained in the manure chemically react with the acid to form soluble salts. The acids are used in an amount so that there is an equal molar exchange or reaction basis and so that sterilization of the manure is achieved. A slurry containing various solid fractions and an acid-water fraction is formed. The various fractions, each separated from each other, are recovered from the slurry.

DETAILED DESCRIPTION OF THIS INVENTION

The process of this invention sterilizes and deodorizes the animal manure as well as reduces the normal excess of mineral matter and renders the resulting fiber and protein fractions more easily digestible.

According to the process of this invention, an acid solution (aqueous) is prepared to which either wet or dry manure is added — a chemical reaction takes place between the essentially basic minerals like calcium, potassium, sodium, magnesium, etc., contained in the manure and the acid to form soluble salts. An example of the preferred acid and concentration is hydrochloric acid (HCl) in a concentration varying between 0.25 and 6.0 N. The amount of acid used is that amount which is about equal on a molar (exchange or reaction) basis to the amount of essentially basic minerals present in the manure and which is necessary to achieve the sterilization desired. The chloride salts of the various minerals are soluble in the water fraction of the slurry created by the above process.

Other useful inorganic acids include sulfuric acid, phosphoric acid, nitrous acid, phosphoric acid, nitric acid and sulfurous acid.

The manure-acid solution is mixed, preferably by slow stirring, during the time period when the chemical reaction takes place. The time period can be from a few minutes up to an hour. The solution is then allowed to settle until a clear separation has occurred between the various solid fractions and the acid-water solution. Separation can be achieved by other suitable separation means, such as, centrifugation, but gravimetric separation as described above is preferred as it is quite feasible and economical.

The separated acid-water solution (M) is decanted from above the settled mass — this refers specifically to the gravimetric separation method, but the results are representative of all of the suitable separation means. Then the top-most layer of the settled mass containing 15 to 30 percent of protein is removed. This protein fraction (I) may represent one fourth of the original dry weight of the manure. The fibrous portion (II) lies just below protein fraction I and contains about 8 percent protein, about 15 percent ash and about 60 percent carbohydrate material, on an air dried basis. Fibrous portion II may represent one-half or more of the original dry weight of the manure. Finally, the lower-most layer (III) of insoluble mineral matter, i.e., silicates and other insolubles, is removed. This fraction (III) may be used as land fill or other building material. Protein fraction I and fiber fraction II are pressed to remove any free water-acid solution and are then dried in any convenient manner (e.g., using an alfalfa type dryer, a belt drier or a drum drier, or even sun dried where appropriate). Fraction II may be ensiled or mixed with other ingredients and fed without drying.

The mineral matter of the decanted acid water solution (M) can be precipitated by adding an appropriate alkali, such as, CaOH (preferred), barium carbonate, aluminum hydroxide, potassium hydroxide, sodium hydroxide, sodium carbonate, strontium carbonate, calcium carbonate, zinc hydroxide, sodium hydroxide, magnesium carbonate, magnesium hydroxide and lithium hydroxide. Any hydroxide or carbonate of an alkali metal or alkaline earth metal can be used. The precipitate is dried to obtain its mineral fertilizer content, and the water left over the precipitation can be re-used in the process.

As stated above the acidification may be adjusted to an appropriate level, e.g., to 5 pH in order to eliminate Salmonella. Most of the bacteria will also be eliminated at such a pH, but there are, as is well known, certain bacteria which requires a lower pH for their elimination.

The recovery of the valuable fiber and protein fractions, after having obtained the water soluble salts, can be achieved by using any suitable or conventional recovery methods, so this invention is not limited to the stirring, setting and decanting procedures described above.

The process according to this invention may be carried out on a continuous basis, rather than by the batch system described above, by circulating acidified water through a continuous flow of manure feed.

What is claimed is:

1. A process for producing an animal feed or a fertilizer ingredient from animal manure which comprises admixing an acid solution and either wet or dry manure whereby the essentially basic minerals contained in said manure and said acid chemically react, soluble salts being formed, said acid being used on an equal molar exchange or reaction basis with said essentially basic minerals so that said soluble salts are formed and so that sterilization of said manure is achieved, and a slurry containing various solid fractions and an acid-water fraction being formed, and recovering from said various fractions, each separated from each other, from said slurry.

2. A process according to claim 1 wherein said manure-acid solution is mixed by slow stirring and said resultant slurry is allowed to settle until a clear separation between said various solid fractions and said acid-water fraction occurs.

3. A process according to claim 1 wherein said various solid fractions are separated from said acid-water fraction is achieved by centrifugation.

4. A process according to claim 1 wheren said various solid fractions are separated from said acid-water fraction is achieved by gravimetric separation.

5. A process according to claim 1 wherein the fiber and protein fractions of said various solid fractions are separated from the other fractions of said various solid fractions and each other and are dried.

6. A process according to claim 1 wherein said acid solution, after separation from said various solid fractions, is recycled to said admixing step.

7. A process according to claim 1 wherein said acid solution is circulated through a continuous flow of said manure.

8. A process according to claim 1 wherein said manure is added to said acid solution.

9. A process according to claim 1 wherein said acid solution is an aqueous solution of hydrochloride acid having a concentration between 0.25 and 6 N.

10. A process according to claim 1 wherein said acid in said acid solution is an inorganic acid.

11. A process according to claim 1 wherein said separation is achieved by any conventional means.

12. The composition produced by the process of claim 1, which can be used as an animal feed or a fertilizer ingredient.

13. A process for producing an animal feed or a fertilizer ingredient from animal manure which comprises admixing an acid solution and either wet or dry manure whereby the essentially basic minerals contained in said manure and said acid chemically react, soluble salts being formed, said acid being used on an equal molar exchange or reaction basis with said essentially basic minerals so that said soluble salts are formed and so that sterilization of said manure is achieved, and a slurry containing various solid fractions and an acid-water fraction being formed, gravimetrically separating said fractions, and precipitating said soluble salts from said acid-water fraction by the addition of an alkali.

* * * * *